United States Patent Office
3,341,936
Patented Sept. 19, 1967

3,341,936
METHOD OF PRODUCING ELECTRODES
Gerd Sanstede, Alfons Köhling, Helmar Krupp, Helmut Rabenhorst, Kurt Richter, and Gerhard Walter, Frankfurt am Main, Germany, assignors to Robert Bosch GmbH, Stuttgart, Germany
No Drawing. Filed Aug. 26, 1963, Ser. No. 304,618
Claims priority, application Germany, Sept. 7, 1962, B 68,756
16 Claims. (Cl. 29—529)

The present invention relates to a method of producing electrodes and, more particularly, the present invention is concerned with producing electrodes for electrochemical processes, such as electrodes for electrochemical fuel cells.

Electrodes of the type produced according to the present invention carry a metal catalyst in finely subdivided form. The metal catalyst which forms part of the electrode produced according to the present invention may be compared with Raney catalysts, inasmuch as the metal catalyst of the present electrodes is also present in finely subdivided form, however, according to the present invention only a very small amount of the frequently expensive metal, for instance platinum or silver, will be required for forming the catalyst portion of the electrode.

It is an object of the present invention to produce electrodes of the type described in a simple and economical manner.

It is another object of the present invention to produce an electrode for an electrochemical fuel cell and the like which will include a relatively small proportion of a finely subdivided metal catalyst.

It is a further object of the present invention to produce an oxygen electrode including a silver catalyst, particularly suitable for use in electrochemical fuel cells.

It is yet a further object of the present invention to provide a method for producing an oxygen electrode for electrochemical fuel cells which consists essentially of graphite with a silver catalyst adhering thereto in a relatively small but nevertheless highly effective proportion.

Other objects and advantages of the present invention will become apparent from a further reading of the description and of the appended claims.

With the above and other objects in view, the present invention contemplates in a method of producing an electrode for electrochemical processes, such as an electrode for an electrochemical fuel cell, the steps of applying to an electrically conductive support a material including as one of the components thereof a metal adapted to act in finely subdivided form as a catalyst in an electrode for a fuel cell and the like, and removing all components of the material with the exception of the metal, thereby retaining, due to the removal of the components, on the electrically conductive support the metal in finely subdivided form and thus adapted to act as a catalyst, and forming an electrode consisting essentially of the electrically conductive support with the finely subdivided metal adhering thereto.

According to one embodiment of the present invention, the same comprises a method of producing a porous electrode for electrochemical processes, such as an electrode for an electrochemical fuel cell, comprising the steps of at least partially filling the pores of a porous electrically conductive electrode body with the components of an alloy comprising a nobler and a less noble metal, the nobler metal being adapted to act in finely subdivided form as a catalyst in an electrode for a fuel cell and the like, forming of the components in the pores of the electrode body the alloy, and dissolving the less noble metal of the alloy so as to retain in the pores of the electrode body only the nobler metal in the form of a finely subdivided catalytically active layer.

It is also within the scope of the present invention to provide a method of producing an electrode for electrochemical processes, such as an electrode for an electrochemical fuel cell, comprising the steps of applying by vapor deposition to an electrically conductive support a nobler and a less noble metal, the nobler metal being adapted to act in finely subdivided form as catalyst in an electrode for a fuel cell and the like, and dissolving the less noble of the thus-deposited metals, so as to retain on said support only the nobler metal in finely subdivided form.

The present invention also encompasses a method of producing a porous oxygen electrode for electrochemical processes, such as an electrode for an electrochemical fuel cell, comprising the steps of impregnating a porous, electrically conductive electrode body with a solution of a silver compound, drying the impregnated electrode body thereby retaining the silver compound thereon, and reducing the retained silver compound at a temperature below the thermal decomposition temperature thereof to metallic silver so as to retain the metallic silver on the porous electrode body in finely subdivided catalytically active form.

Thus, according to the present invention, an electrode may be produced by impregnating a porous, electrically conductive electrode body with a liquid consisting of, or including, the components of a metal alloy, which components include a nobler and a less noble metal. After forming the metal alloy on the electrode body, the less noble metal is dissolved so that only the nobler metal is retained on the electrode body in finely subdivided form, generally as thin layer of highly disordered surface configuration, and this nobler metal is so chosen as to have in such finely subdivided form the desired catalytic effect. In this manner it is possible to apply the metal catalyst in a very thin layer at the outer faces and at the walls of the pores of the electrode body.

Such electrodes are suitable as fuel electrodes and as oxygen electrodes and, depending on the specific metal catalyst, they may be used in an alkaline, neutral or acidic electrolyte. The fuel electrodes may be used as gas electrodes, for instance for oxidizing hydrogen or gaseous hydrocarbons, or also as immersed electrodes, for instance for oxidizing methanol which is dissolved in the electrolyte.

It is further proposed, according to the present invention, to impregnate the porous electrode body with solutions of salts of a nobler and a less noble metal. The salts are then reduced while located in the pores of the electrode, either electrochemically or with hydrogen and the thus obtained metals are alloyed at elevated temperatures and, finally, the less noble alloy component is dissolved and thereby the nobler metal is retained in finely subdivided form in the pores and on the outer surface of the electrode body.

It is also possible according to the present invention to impregnate the porous electrode body with one solution only, which solution includes salts of the nobler catalyst-forming metal and of the less noble metal. Thereafter, for instance by reduction with hydrogen gas, the salts are decomposed in the pores and on the surface of the electrode body and, if the reduction temperature is chosen sufficiently high, for instance at about 500° C., the metals which are formed by such reduction will form an alloy with each other. From this alloy, the less noble metal is then dissolved again as described above.

It is not necessary to reach the melting temperature of the two alloy components for forming the alloy by reduction of the metal salts deposited on the electrode body, due to the fact that the alloy components are formed and are then present in very finely subdivided condition and thus are particularly highly reactive. However, it is also possible to apply the salt solutions of the two components of the alloy in succession to the electrode body and then to jointly reduce the salts deposited on the electrode body; or first to apply the salt of one component and to reduce the same, and thereafter to impregnate the electrode body with a salt solution of the second component. However, in the last mentioned case, the reaction temperature required for forming of the alloy will be somewhat higher since the path of diffusion of the metals is somewhat lengthened by the subsequent, rather than simultaneous, precipitation of the same.

Furthermore, it is possible to impregnate the porous electrode body with a molten alloy consisting of a nobler and a less noble metal, whereby the nobler metal will be capable of forming in finely subdivided state the desired catalyst and, after the molten alloy has solidified in the pores of the electrode body, to dissolve the less noble component thereof.

Finally, in further variations of the method of applying the two metals to the electrode body, it is also possible to first impregnate the porous electrode body with the solution of a salt of one of the metal components and, after reduction of this salt on the electrode body to the respective metal component, to impregnate the electrode body including the first applied metal component with the other metal component in molten condition, so that by contact between the first formed metal component and the subsequently applied molten second metal component, the alloy of the two components will be formed in the pores of the electrode body.

The impregnation of the electrode with the molten alloy is to be carried out at superatmospheric pressure in order to assure that the molten metal will penetrate into the narrow pores of the electrode body which pores preferably will have diameters of only a few microns. In this case, the alloy is first produced by melting the components, for instance silver and aluminum, together. The alloy is then placed into a crucible which is located in an autoclave. The porous electrode body, for instance consisting of graphite or of sintered nickel, is held in the autoclave in a suitable device such as a clamp so as to be movable in upward and downward direction. After heating the autoclave and substantially evacuating the same, the porous electrode body is immersed by downward movement in the molten alloy and the autoclave is then filled with an inert gas under pressure, for instance argon, so as to produce within the autoclave a superatmospheric pressure of about 40 atmospheres above normal pressure. Thereby, the molten alloy is pressed into the pores of the electrode body. The thus impregnated electrode body is then withdrawn from the molten alloy and retained in the autoclave under pressure while the temperature is reduced, until the alloy in the electrode body has solidified.

According to another manner of carrying out the impregnation, it is provided that the metal which eventually will serve as catalyst is first introduced into the pores. For instance, a porous, sintered tantalum body is impregnated with an aqueous solution of hexachloro platinic acid and metallic platinum is formed in the pores of the sintered tantalum body by reduction of the hexachloro platinic acid with hydrogen gas or by electrochemical reduction thereof. The porous body with platinum contained in its pores is now immersed, as described above, in a molten metal which represents the less noble alloy constituent, for instance tin. The molten tin dissolves the platinum in situ so that in the pores a platinum-alloy is formed while outside of the porous body the metal will consist exclusively of tin.

The metals which are suitable to serve as the less noble alloy component include, in addition to tin, also aluminum, calcium, zinc and lead. The catalyst-forming metals are preferably chosen from the metals of Group VIII of the Periodic System and silver. The catalytic activity of the metal will be increased if the finely subdivided metal catalyst is formed of a plurality of suitable metals, or if the catalyst metal includes an addition which per se is of lesser catalytic activity but which improves the catalytic activity of the above mentioned nobler metals. Such addition may consist, for instance, of gold, vanadium or molybdenum.

Finely subdivided catalysts produced according to the present invention and consisting of nickel and palladium have been found to be particularly suitable for the electrochemical oxidation of hydrogen, methanol and other alcohols in an alkaline electrolyte. On the other hand, in an acidic electrolyte such as sulfuric acid, methanol is is best reacted on electrodes which include a finely subdivided catalyst consisting of platinum, rhodium, irridium or ruthenium. These last named catalysts are also suitable for the electrochemical reduction of oxygen in an acidic electrolyte, while for the electrochemical reduction of oxygen in an alkaline electrolyte preferably a silver catalyst will be employed.

The metals of the platinum group have the further advantage that they are resistant against acid. Thus, it is possible to use, for instance, 5-normal sulfuric acid as the electrolyte in a fuel cell. If, for instance, methanol or a hydrocarbon is to be reacted at the fuel electrode, the carbon dioxide generated thereby may escape in gaseous form. In an alkaline electrolyte, the carbon dioxide would be dissolved and thereby the hydroxide of the electrolyte would be consumed under formation of carbonate so that the electrolyte would have to be replenished.

Porous graphite as well as sintered metal bodies have been found to be particularly suitable for forming the porous electrode bodies on which, according to the present invention, a finely subdivided metal catalyst is formed. The sintered metal bodies must possess a very high degree of porosity, preferably between 50 and 70%, and may be produced of finely subdivided metal powders, such as finely subdivided nickel, cobalt or steel. As an acid-resistant metal, for instance, tantalum may be used for forming the sintered metal body.

The following examples of specific manners of carrying out the process of the present invention as described up to now, are given as illustrative only without, however, limiting the invention to the specific details of the examples.

EXAMPLE I

An aqueous solution is formed containing 300 g. per liter of silver nitrate and 500 g. per liter of cadmium nitrate. The solution is heated to 80° C. and a graphite disc or plate having a thickness of 3 mm. and a porosity of 50% is immersed therein. Prior to immersion of the graphite disc, the same has been boiled in 20% nitric acid, washed with water and dried. After boiling the graphite disc for 5 minutes in the silver nitrate-cadmium nitrate solution, the solution is allowed to cool and the graphite body is then removed therefrom. After a short rinse with water, the thus impregnated graphite body is subjected to freeze drying. The dry electrode body formed in this manner is then quickly heated in a hydrogen gas atmosphere to a temperature of about 500° C. Thereby, the nitrates are reduced and the thus freed silver and cadmium form an alloy. After cooling, the cadmium of the alloy is dissolved by boiling of the graphite body in 20% acetic acid, and the electrode is then dried in a stream of air. Thereby, the silver remains in finely subdivided condition adhered to the walls of the pores and to the surfaces of the graphite electrode. The electrode is then, after drying, adhered, for instance adhesively, to a holding member which may consist, for instance, of polymerized methyl methacrylate such as is known under the trade name Plexiglas, and which includes a current conducting wire and a gas supply tube so that oxygen or air may be pressed through the electrode while the same is immersed in the electrolyte. The electrode is now ready for use as oxygen electrode in a fuel cell with alkaline electrolyte. The electrode contains only about 30 mg. silver per cm.$^2$ of geometrical surface area and requires only a slight overpresure of about 0.3 atmosphere above atmospheric pressure.

EXAMPLE II

In order to provide a porous graphite electrode with a finely subdivided palladium catalyst, an aqueous solution of palladium nitrate and lead nitrate, containing 100 g. palladium nitrate and 200 g. lead nitrate per liter is produced. The graphite disc, which has been previously boiled in 20% nitric acid, rinsed and dried as described in Example I, is immersed in the boiling palladium nitrate-lead nitrate solution and the solution is then cooled while the graphite disc remains immersed therein. After cooling of the solution, the graphite disc is removed, rinsed with water and freeze dried. Thereafter, the graphite disc is quickly heated to about 600° C. in a hydrogen gas atmosphere. Thereby the nitrates are reduced and the metals thereof form immediately a palladium-lead alloy. From the palladium-lead alloy which is thus formed in the pores and on the surface of the graphite disc, the lead is removed by treatment with 50% aqueous potassium hydroxide solution at a temperature of 80° C. After subsequent drying, the electrode is connected to a holder including an electric conductor for withdrawing current from the electrode. The electrode may be used as an immersed electrode, for instance for the oxidation of methanol, or also as gas electrode and requires only a small overpressure of about 0.3 atmosphere.

EXAMPLE III

A porous graphite body or a body of sintered nickel is impregnated with an aqueous solution containing per liter 250 g. of platinum nitrate and 150 g. of copper nitrate. The further treatment is carried out corresponding to that described in Examples I and II, however, the temperature required for forming the alloy upon reduction of the platinum and copper salts must be between about 700 and 800° C., due to the higher melting point of the components of the present example. Thereafter, the copper component of the alloy is dissolved with 20% nitric acid. The thus produced electrode contains only a few mg. of platinum per cm.$^2$ of geometrical surface area and is excellently suitable as oxygen electrode and also as fuel electrode for use in an acidic electrolyte.

EXAMPLE IV

A porous graphite electrode body is impregnated with a solution containing per liter 150 g. of nickel chloride and 200 g. of either tin or zinc chloride. After drying of the graphite body holding the above salts in its pores, the graphite body is arranged as cathode in a 15% aqueous sodium chloride solution. Upon passing of current therethrough, the salts in the pores of the electrode are reduced before they can dissolve and migrate out of the pores. After washing and drying of the electrode body which now holds in its pores metallic nickel, and tin or zinc, the electrode is heated in an inert gas atmosphere to a temperature of about 600° C. and thereby the nickel-tin or nickel-zinc alloy is formed. For instance in the case of the nickel-tin alloy, the tin is then dissolved by treatment with 65% aqueous potassium hydroxide solution. The thus produced electrode is suitable as fuel electrode in an alkaline fuel cell.

EXAMPLE V

A graphite plate or disc electrode having a porosity of about 60% and including a finely subdivided silver catalyst is to be used for the electrochemical reduction of oxygen in an alkaline electrolyte.

The electrode is produced by first forming a silver-zinc alloy containing 10% by weight of silver. A crucible containing the silver-zinc alloy is placed into an autoclave. The graphite disc is positioned in the autoclave above the crucible and connected to a holding device which permits upward and downward movement of the graphite disc. The alloy is then molten by being heated to a temperature of about 500° C. Thereafter, while the alloy is maintained in molten state, the autoclave is quickly evacuated to a residual absolute pressure of about 1 mm. mercury and the graphite body is then immersed in the molten alloy. While the graphite body remains immersed in the molten alloy, the autoclave is filled with argon at a pressure of 30 atmospheres above atmospheric pressure. The thus impregnated graphite body is withdrawn from the molten alloy and maintained in the autoclave under pressure until the graphite body is sufficiently cooled so that the alloy in the pores thereof will solidify.

The graphite body with the alloy in the pores thereof is now taken out of the autoclave and treated with 6-normal potassium hydroxide solution.

Thereby the zinc is dissolved while the silver remains in the pores of the graphite body in homogeneous finely subdivided distribution. The electrode is then boiled in water, dried and adhesively adhered to a holding member, for instance, of Plexiglas. The holder is provided with a current withdrawal wire and with a gas supply tube so that oxygen or air may be pressed through the electrode while the same is immersed in the electrolyte. The electrode requires only a slight overpressure equal to about 0.5 atmosphere. The thus produced electrode contains about 30 mg. silver per cm.$^2$ of geometrical surface area.

EXAMPLE VI

A porous electrode body of graphite or sintered nickel is supplied with a finely dispersed platinum catalyst by forming an alloy of 99% by weight of lead and 1% by weight of platinum and impregnating the porous electrode body with the alloy in the manner described in the preceding example. After the molten alloy has solidified in the pores of the electrode body, the electrode body is removed from the autoclave and treated with 70% nitric acid. Thereby, the lead is dissolved and a finely subdivided platinum layer remains in the pores of the electrode. After mounting the electrode in a holder, the same may be used in an acidic electrolyte as oxygen electrode or also as fuel electrode.

EXAMPLE VII

A nickel catalyst is applied to a porous graphite body by impregnating the graphite body with a molten alloy consisting of 80% by weight of aluminum and 20% by weight of nickel. The temperature of the molten alloy is maintained at about 700° C. and the impregnation is carried out as described in Example V. The aluminum is then dissolved from the pores of the graphite body by treatment with 6-normal potassium hydroxide solution. The thus obtained electrode is suitable only for use in an alkaline electrolyte and gives excellent results as hydrogen electrode. However, it may also be used for the electrochemical oxidation of methanol.

EXAMPLE VIII

A graphite body which has been boiled in 20% nitric acid is immersed in a boiling aqueous solution containing 100 g. of palladium nitrate per liter. The solution with the graphite body therein is then allowed to cool, thereafter the graphite body is removed from the solution, rinsed with water for a short period of time and freeze dried in order to prevent the salt from creeping out of the pores. Thereafter, the impregnated graphite body is heated in a hydrogen gas atmosphere at a temperature of 200° C., whereby metallic palladium is formed. The thus pre-treated graphite body is now further impregnated with molten tin under pressure, i.e., in an autoclave as described above. In this manner a palladium-tin alloy is formed in the pores of the graphite body. After cooling of the thus treated graphite body, the tin is dissolved with 70% potassium hydroxide solution and a thin layer of finely subdivided palladium is retained in the pores of the graphite electrode.

EXAMPLE IX

A fuel electrode is produced by impregnating a porous graphite felt with a solution of palladium nitrate and nickel nitrate, the solution containing palladium and nickel in an atomic relationship of 0.5:1. The solution is applied in droplets to the graphite felt. After drying, the thus impregnated graphite felt electrode body is heated in a hydrogen gas atmosphere to a temperature of 500° C., whereby the nitrates are reduced and the metals are retained on the electrode body. Thereafter, the electrode body is immersed in an autoclave under a pressure of 30 atmospheres above atmospheric pressure into molten aluminum maintained at 700° C. After removal of the electrode body from the molten aluminum body and cooling so as to solidify the aluminum, the aluminum is dissolved from the palladium-nickel-aluminum alloy which has been formed upon immersion of the electrode body in the molten aluminum. This is accomplished by treatment with 6-normal sodium hydroxide solution. The thus produced electrode, including the finely dispersed nickel-palladium layer, is then mounted in a holder and may be used as methanol electrode.

EXAMPLE X

A metal skeleton for an electrode is obtained by sintering of nickel powder. Carbonyl-nickel powder is mixed with an equal volume of ammonium carbonate powder and is then pressed under a pressure of 2000 kg./cm.$^2$ so as to form a plate of 3 mm. thickness. The thus formed plate is then slowly heated in a hydrogen gas atmosphere, whereby the ammonium carbonate evaporates and, upon reaching a temperature of 700° C., the nickel powder forms a sintered body. The thus obtained sintered nickel body is immersed in a 25% ammoniacalic silver carbonate solution and is cathodically silver plated by applying a current density of 10 milliamperes/cm.$^2$. The porous electrode body is then further impregnated with a solution of hexachloro platinic acid and irridium chloride, in an atomic relationship of the metals of 3 atoms of platinum for each atom of irridium, by applying droplets of the solution to the porous electrode body.

Thereafter, the electrode body is heated in a stream of hydrogen gas to a temperature of 150° C. and thereby metallic platinum and irridium are precipitated. This is followed by further impregnation with cadmium nitrate in a relationship of 3 atoms of cadmium for each atom of a metal of the platinum group. The thus adhered cadmium nitrate is then reduced to 500° C., whereby the cadmium will form an alloy with the metals of the platinum group. From the thus formed alloy, the cadmium is dissolved with 30% acetic acid so that the platinum-irridium catalyst is retained in the pores of the electrode. The thus formed electrode is then mounted in a holder formed with a gas conduit and may be used as gas electrode at an overpressure of about 1 atmosphere above atmospheric pressure.

According to another embodiment of the present invention, the metal alloy is formed on the electrode body by vapor deposition, and the less noble metal of the alloy is then removed so that the nobler metal will form a finely subdivided layer possessing catalytic properties. The less noble metal may be dissolved with acid or alkali and, if necessary, the layer formed by vapor deposition may be heated in order to form the alloy. The supporting structure of the thus-formed electrodes preferably should be a porous body.

It is an advantage of producing electrodes according to the present invention that the finely subdivided metal catalyst will form a coherent, thin layer of strongly disordered surface configuration on the electrode body, although only a relatively very small amount of the nobler, catalytically active metal is required.

For forming on a graphite electrode disc such layer of palladium which broadly might be described as a Raney-type palladium layer, the disc is mounted in a vacuum bell jar above the supply of metals which are to be evaporated. Two evaporation devices are provided underneath the graphite disc in the vacuum bell jar, one containing palladium, the other containing aluminum. After evacuation of the jar, the graphite disc is heated, for instance by radiant heating, to a temperature of about 300° C. Furthermore, the still covered evaporating devices are heated and thereby the temperatures of the now molten palladium and aluminum, each located in one of the evaporation devices, are so adjusted relative to each other that the speed of evaporation of the aluminum is about twice as great as that of palladium. Thereafter, the graphite disc is exposed to the aluminum and palladium vapors until a metal layer of about 1 micron thickness is formed thereon. Preferably, during vapor deposition of the metals, the graphite disc is inclined against the horizontal under an angle of between 10° and 30° and is turned about its vertical axis so that, in this manner, a more even exposure of the disc to the metal vapors is achieved and also the walls of the pores which open into the surface of the disc will be exposed to metal vapors, generally up to a depth of about 10 microns.

Depending on the chemical properties and resistance of the catalytic metal and of the material of the electrode body against acids and alkali, the thus formed electrodes may be used in contact with an alkaline or acidic electrolyte. They are suitable, on the one hand, for the electrochemical reduction of gaseous oxygen and, on the other hand, also as fuel electrodes. The fuel electrodes may either be gas electrodes, for instance for the oxidation of hydrogen or propane, or they may be immersible electrodes, for instance for the oxidation of methanol dissolved in the electrolyte.

During the vapor deposition of the metals the temperature of the electrode body is maintained far below the melting point of the alloy. Nevertheless, upon simultaneous vapor deposition of the components of the alloy, the alloy will be formed since the metals reach the surface of the electrode body in atomic form and thus are highly reactive. High vacuum must be maintained, the residual pressure should not exceed 10$^{-4}$ mm. mercury, or, in any event, the residual gas in the evacuated vessel must be free of oxygen in order to avoid oxidation of the aluminum and thereby interference with the alloy formation.

After the alloy has thus been formed by vapor deposition on the electrode body, the electrode body is immersed in an alkaline liquid in order to dissolve the aluminum of the alloy layer. So that the aluminum may be dissolved rather slowly, the electrode body is preferably first immersed in a cold, highly dilute hydroxide such as potassium hydroxide, and the dissolution of the aluminum is terminated with hot 20% potassium hydroxide solution or an equivalent solution of another alkali metal hydroxide. There is no danger of dislocating the palladium crystallites, as long as the dissolution of aluminum is not carried out too rapidly. The vapor-deposited layer is completely changed by the dissolution of the aluminum thereof, since now the thus-freed palladium has to adhere again at its support and in the presence of water. Thereby a very thin finely porous layer of palladium is formed which in many respects has the characteristics of Raney-type metal.

It is also possible to apply the alloy components by successive vapor deposition. Thereby the advantage is achieved that the electrode body, for instance a graphite plate or a plate of sintered nickel may be passed at a short distance over the adjacently arranged sources of, for instance, palladium and aluminum vapors. This method is suitable for continuous vapor deposition on a band-shaped electrode body. However, after thus successively depositing layers of the nobler and less noble metal, the composite layer which thus has been formed on the electrode body by vapor deposition is heated, for instance, by radiant heating to form an alloy of the deposited metals. In this manner, it is possible to maintain the major portion of the supporting electrode body at a considerably lower temperature. On the other hand, it is also possible to heat the entire electrode body, i.e. the vapor deposited metal layer as well as the underlying graphite or sintered metal body. The temperature for forming the alloy of the successively applied metal layers must be chosen somewhat higher than the temperature required when the two metal vapors are directed simultaneously towards the electrode body, since the now formed separate layers of the alloy components must diffuse into each other. The heating has to be carried out in an inert gas atmosphere or in a substantial vacuum in order to prevent oxidation of the alloying components.

The electrode body which is subjected to vapor deposition may be formed of graphite discs, graphite fabrics, graphic felt, metallic sinter bodies, metal wire matting or the like. It is also possible to use as the underlying body or skeleton of the electrode a sintered ceramic body or a porous synthetic material or other acid or alkali resistant fabrics or felts. However, these, per se, non-conductive bodies must first be made electrically conductive by metallization. This, for instance, can be achieved by vapor deposition of a suitable metal. It is also possible to form on thin layers of fabrics of felts by vapor deposition as described further above alloys of a nobler and a less noble metal, and removing the less noble metal so as to retain on the electrode body only the catalytic active layer of finely subdivided metal; and thereafter to compress several of the thus treated layers of fabric or felt into a porous electrode. In a somewhat similar manner, it is also possible to produce electrodes of pulverulent materials by first forming the alloy of a nobler and less noble metal on the pulverulent supporting material, then removing the less noble metal of the alloy; and compressing the thus activated pulverulent material with or without additional synthetic material or metal powder so as to form a shape-retaining electrode thereof.

Many metals may serve as the less noble alloy component which has to be dissolved in order to obtain the layer of the nobler metal catalytically active material with a very large, disordered, active surface. Such less noble metal include aluminum and tin. Metals which in finely subdivided form possess the desired catalytic properties include silver and the metals of the VIII Group of the Periodic System. The catalytic activity of these metals can be increased by using instead of a single catalytically active metal a mixture of such catalytically active metals, or by adding to one catalytic active metal another metal which per se has less catalytic activity, such as gold, vanadium, molybdenum or chromium. In order to obtain the catalytic active layer composed of several metals, all of the components of the catalytically active layer, as well as the less noble metal which is to be dissolved are vapor deposited on the electrode support.

For the electrochemical oxidation of hydrogen, methanol or other alcohols in an alkaline electrolyte, for instance in an aqueous alkali metal hydroxide solution, nickel and palladium in the finely subdivided form in which they adhere to the electrode body according to the present invention, has shown very good results. In an acidic electrolyte, for instance sulfuric acid, methanol preferably will be reacted at electrodes which include a vapor deposited finely subdivided layer of either platinum, rhodium, irridium or ruthenium. These last named catalysts are also suitable for the electrochemical reduction of oxygen in an acidic electrolyte, while silver appears to be best suitable if the reaction is to be carried out in an alkaline electrolyte.

It is an advantage of the metals of the platinum group that they are acid resistant. For this reason, it is also possible to use an acidic electrolyte in the fuel cell utilizing a catalyst of the platinum group. This is particularly desirable for the reaction at the fuel electrode of methanol or other hydrocarbons because in such case the carbon dioxide generated during the reaction may escape in gaseous form. In contrast thereto, if the reaction were carried out in an alkaline electrolyte, the carbon dioxide would be dissolved and would convert the hydroxide of the alkaline electrolyte into carbonate, so that the electrolyte would have to be replenished continuously or from time to time.

It may also be mentioned that the electrodes according to the present invention are excellently suitable for the electrolysis of, for instance, water. In this case, it is not necessary to carry out the vapor deposition on a porous support but good results are also obtained by using as the electrode skeleton or body, for instance, a metal sheet.

The last described embodiments of the present invention will be further illustrated in the following examples, without, however, limiting the invention to the specific details of these examples.

EXAMPLE XI

An electrode containing silver as catalyst for the electrochemical reduction of oxygen in an alkaline electrolyte is produced, with a porous graphite disc of 5 cm. diameter as the electrode body.

Aluminum serves as the less noble alloy component. The electrode is made as follows:

Two crucibles which can be heated by electric resistance heating, one containing silver and the other aluminum, are located at a distance of 5 cm. from each other in the bell jar of a high vacuum vapor deposition arrangement which is then evacuated down to a residual pressure of $10^{-5}$ mm. mercury. Above the crucibles, at a distance of 10 cm. therefrom, a holding or clamping device is arranged which is turnable in every direction by about 10°. This holding device serves for holding the graphite disc. However, before introducing the graphite disc, a test plate is attached to the holding device and the heating current for the crucibles is now determined which is required in order to form on the test plate within one minute by vapor deposition a metal layer having a thickness of 1 micron and in which the atomic relationship between silver and aluminum equals about 1:3. This is determined by successively vaporizing metal from each of the crucibles, after each vapor deposition weighing the carrier plate, and adjusting the electric current until the weight increase of the carrier plate which is obtained by 1 minute vapor deposition thereon corresponds to the desired thickness of the deposited metal layer.

After thus adjusting the heating devices for the crucibles, the graphite disc is attached to the holding device, the bell jar is again evacuated and the heating devices of the crucibles are switched on while the crucibles remain covered. Furthermore, a radiant heating device located above the graphite disc is activated so that the graphite disc will be heated to a temperature of about 300° C. As soon as the crucibles have reached the desired evaporation temperature, the covers are removed therefrom and the graphite disc is subjected to vapor deposition for 1 minute and is turned during this minute in all possible directions and to the extent of about 10° in order to facilitate penetration of the vaporized metal into the pores of the graphite disc which open into the surface of the disc.

After completion of the vapor deposition of silver and aluminum with simultaneous formation of a silver-aluminum alloy, the graphite disc with the metal deposited thereon is immersed in cold 1-normal potassium hydroxide. Thereby, the aluminum component of the alloy is dissolved under hydrogen gas formation. Towards the end of the dissolution process, the concentration of the potassium hydroxide is increased up to about 5- normal and the potassium hydroxide solution is heated. In this manner the aluminum will be dissolved and the electrode will be provided with about 1 mg. silver catalyst per cm.$^2$ of geometrical surface area. The electrode is now boiled in water, dried and then adhesively fixed to a holding device, formed for instance of Plexiglas. The holding device includes a metal wire for withdrawing electric current from the electrode, and a tube for introducing gas so that oxygen or air could be pressed through the electrode into the electrolyte in which the electrode is immersed during operation of the battery.

It is possible in a corresponding manner to apply to a porous graphite disc or the like other metal catalysts and thereby to form, for instance, a fuel electrode for hydrogen gas or propane.

EXAMPLE XII

An electrode provided with a palladium catalyst for the oxidation of methanol dissolved in an electrolyte is produced by subjecting both faces of a thin graphite fabric to vapor deposition of palladium and aluminum. The process described in Example XI is followed. After completing vapor deposition on one face of the fabric, the same is turned and the other face of the fabric is subjected to vapor deposition. If the electric heating device does not suffice to vaporize palladium from a crucible with the required speed, it is also possible and frequently advisable to vaporize palladium from a coiled tungsten filament. In this manner it is possible to reach the evaporation temperature of palladium, which is higher than that of silver, in a shorter period of time. After vapor deposition has been completed, the aluminum is dissolved from the alloy deposit by dissolution with alkali metal hydroxide. The thus-formed Raney-type palladium layer will now remain as a thin layer on both faces of the graphite fabric. The thus treated graphite fabric is placed into a frame provided with metal wire for withdrawing current and may be immersed as methanol electrode into the electrolyte. The palladium of this example may also be replaced by nickel.

EXAMPLE XIII

This example is concerned with producing an electrode provided with a platinum catalyst for use in a hydrogen cell including a cation exchanger membrane as quasi solid acidic electrolyte. For this purpose, a thin graphite felt is subjected to vapor deposition of platinum and, for instance, tin as the less noble alloy component. The process is carried out substantially as described in Example I. However, in order to vaporize platinum with the required speed, electron beam heating is utilized. For this purpose, an electron beam is directed against the platinum in the crucible. With this arrangement, it is possible to form in a few minutes by vapor deposition platinum layers having a thickness of about 1000 Angstroem. Tin is simultaneously applied onto the graphite felt by vapor deposition and in this manner the platinum-tin alloy is formed immediately. After completion of the vapor deposition, the tin is dissolved from the deposited alloy by treatment with 65% potassium hydroxide, so that a very thin layer of Raney-type platinum will be retained at the surface of the graphite felt. A cation exchanger membrane made for instance of Permaplex i.e. a polystyrene sulfonate is interposed between two thus produced electrodes in such a manner that the platinum layers of the two electrodes face the interposed membrane. The thus formed package is compressed by applying under pressure two perforated metal sheets to the outer faces of the electrodes. Each side of the thus formed package is provided with suitable gas conduits and the cell can then be operated with hydrogen and oxygen.

EXAMPLE XIV

A mixed catalyst is applied by vapor deposition substantially in the manner described in Example XI, however, by adding a further source of vaporized metal in the vacuum vapor deposition arrangement. For instance, a palladium-silver catalyst is obtained by vaporizing, and depositing on the electrode body, simultaneously from three crucibles palladium, silver and aluminum, whereby the heating currents for the respective crucibles are so adjusted that the metals palladium, silver and aluminum will be vaporized in the atomic relationship of 2:1:6. The aluminum is then dissolved and the palladium and silver retained on the electrode body as described in Example XI.

EXAMPLE XV

An immersion electrode is obtained by pouring a catalyst-containing graphite powder between two nickel wire meshes and compressing by hand. The meshes or matting are fixed in a frame at a distance of about 2 mm. from each other.

The Raney-type catalyst, for instance a palladium-nickel catalyst is formed on the graphite powder by vapor deposition in the following manner:

The graphite powder having a particle size of about 10 microns is located in a dish in the vacuum vapor deposition device and the graphite powder is turned by a manipulator. The powder is then first subjected to palladium vapor deposition whereby the palladium vapors are formed by resistance heating of a coiled tungsten filament which carries the palladium. The amount of palladium on the tungsten filament is such that the thickness of the layer of palladium on the pulverulent graphite will be equal to about 0.1 micron. Thereafter, in a similar manner, a nickel layer having a thickness of about 0.1 micron is applied by vapor deposition to the graphite powder. Finally, a layer of aluminum having a thickness of 0.3 micron is deposited on the graphite particles. The graphite particles with the metal layers thereon are then heated in a hydrogen atmosphere to 600° C., whereby an alloy is formed of the palladium, nickel and aluminum. The aluminum is then dissolved by treatment of the particles with aqueous 6-normal sodium hydroxide solution.

EXAMPLE XVI

An alloy of high-melting platinum metals is applied by vapor deposition preferably by evaporating the metals jointly by means of electron beam heating. An alloy is first produced of ruthenium, platinum and irridium in the atomic proportions of 40:30:30. The thus formed regulus is placed into a carbon crucible and vaporized therein by means of electron beam heating. For this purpose a high vacuum electron beam is directed towards the regulus whereby metal vapors will be formed in substantially the same proportion of the constituents as the proportion thereof in the alloy, particularly if the energy of the electron beam is maintained at the point of contact with the regulus at about 3 kilowatt per/cm.$^2$. Simultaneously, aluminum is also applied by vapor deposition to the electrode body which consists preferably of a porous, sintered tantalum plate. Aluminum is deposited in an atomic relationship of 3:1 with respect to the sum total of the platinum metals. In this manner, the alloy is immediately formed on the electrode body by vapor deposition. The less noble metal, i.e., the aluminum is then dissolved as described in the previous examples.

Porous oxygen electrodes provided with a silver catalyst may be produced according to the present invention by immersing a porous, electrically conductive electrode body in the solution of a silver salt, drying the thus impregnated electrode body and thereafter reducing the silver compound or silver salt thereon at temperatures which are below the thermal decomposition temperature of the silver compound, so that a metallic silver catalyst will remain on the electrode body.

Silver carbonate is particularly suitable for applying in this manner silver to the porous electric body. The silver carbonate is dissolved in an ammoniacalic ammonium carbonate solution and a porous graphite disc is impregnated at elevated temperature with the thus formed solution. In order to avoid that upon drying of the graphite disc the silver carbonate might creep out of the pores of the graphite disc, the impregnated electrode body is freeze dried, whereby finely subdivided silver carbonate and some ammonium carbonate will be retained in the pores of the electrode body. Thereafter, the graphite body is heated in a hydrogen atmosphere to a temperature of 150° C. Thereby, the ammonium carbonate will be volatilized and the silver carbonate will be reduced to metallic silver. Due to the very low temperature at which the reduction of silver carbonate is carried out, the silver will precipitate in very finely subdivided form and thus present a highly active catalyst.

The porosity of the electrode body may be so chosen that the pressure required for passing oxygen or air through the electrodes will not exceed 0.4 atmosphere above atmospheric pressure.

With such oxygen-contacted electrodes, a no-load potential is found against a hydrogen electrode which in 6-normal potassium hydroxide solution at a temperature of 80° C. amounts to 1080 millivolts. When passing current between such electrode and the hydrogen electrode under otherwise equal conditions and with a current density of 100 milliamperes/cm.$^2$, the potential drops to 880 millivolts and at a current density of 200 milliampere/cm.$^2$ to 730 millivolts. The polarization is affected by the degree of porosity of the respective electrode body.

The silver carbonate described above may be replaced by other inorganic or organic silver salts as the silver supplying compounds. These silver compounds are dissolved in suitable solvents so that the porous electrode body may be impregnated with such silver-containing solution. It is not necessary that the silver salts are reducible with hydrogen, for instance, the reduction of silver chloride may be carried out electrochemically by arranging the silver salt-containing electrode body as the cathode in an alkaline or acidic electrolyte. Thus, for instance, the electrode body may be impregnated with silver nitrate solution and after drying immersed in a dilute sodium carbonate solution in order to then electrochemically reduce the silver carbonate formed thereby. On the other hand, it is also possible to subject the silver nitrate-impregnated and dried electrode body to an hydrogen gas atmosphere at a temperature of 200° C. and thereby to reduce the silver nitrate to metallic silver.

The porous electrode body may consist of graphite or of sintered metal bodies. These sintered metal bodies must possess a high degree of porosity and therefore preferably are produced of finely pulverulent metal such as nickel, cobalt or steel. However, it is also possible to precipitate for instance nickel on a porous electrode skeleton made of synthetic plastic materials whereby the required electric conductivity of the electrode body is obtained by the precipitation of nickel or the like on the synthetic material, and thereafter to proceed as outlined above.

The following examples are directed to the above described embodiments of the method of the present invention for producing porous silver electrodes.

EXAMPLE XVII

Silver carbonate is dissolved in hot ammoniacalic ammonium carbonate solution so as to obtain a concentration of 500 g. of silver carbonate per liter of solution. A graphite disc or plate having a thickness of 3 mm. and a porosity of 60°, is boiled in 20% nitric acid, rinsed with water and dried. Thereafter, the graphic disc is immersed in the above described silver carbonate solution. After removing the thus impregnated graphite body from the silver carbonate solution, the graphite body is quickly rinsed with water and then freeze dried. The dry electrode body is then heated in a hydrogen gas atmosphere to a temperature of 150° C. in order to reduce the silver carbonate in the pores of the graphite body to metallic silver and to volatilize the ammonium carbonate which is located in the pores of the graphite body. The electrode is then mounted in a holding device which includes a wire conductor for withdrawing current and a tube for introducing gas. Such holding device may, for instance, consist of Plexiglas. The holding device is so shaped that only one face of the electrode will contact the electrolyte and the air or oxygen may be pressed through the electrode. In the described manner an electrode is obtained which contains only about 30 mg. silver per cm.$^2$ of geometrical surface area. The electrode will operate with air or oxygen at a pressure of about 0.3 atmosphere above atmospheric pressure and is excellently suitable for use in a fuel cell in combination with an alkaline electrolyte.

EXAMPLE XVIII

A porous sintered body of nickel is produced by grinding carbonyl nickel powder with 60% by volume of ammonium carbonate so as to form an intimate mixture. Thereafter, under a pressure of 10,000 kg./cm.$^2$, a pressed body is formed which is then sintered. The pressed body is slowly heated in a hydrogen gas atmosphere to a temperature of 100° C. in order to volatilize the ammonium carbonate and then is further heated for several minutes at a temperature of 600° C. It is important to choose the sintering temperature as low as possible in order to obtain very fine pores in the sintered body.

The thus obtained porous electrode body is then impregnated with an aqueous silver nitrate solution having a concentration of 500 g. silver nitrate per liter of water. Thereafter, the electrode body is quickly rinsed with water and then freeze dried. The electrode body may now be heated in a hydrogen gas atmosphere at a temperature of 200° C., whereby the silver nitrate is reduced to metallic silver.

Another method which will result in an even more active silver catalyst on the electrode body, consists in immersing the silver nitrate-containing dry electrode body in a sodium carbonate solution. Thereby, the silver nitrate will be converted into silver carbonate. The electrode body may be dried and the silver carbonate reduced with hydrogen at a temperature of 200° C. However, it is more simple to retain the electrode body in the sodium carbonate solution and to electrochemically reduce the silver carbonate. For this purpose, the electrode will be used as a cathode and current will be passed at a density of 50 milliamperes cm.$^2$ so that the potential will remain higher than the hydrogen potential. After the thus completed electrode has been mounted in a suitable holding device, it may be used for the electrochemical reduction of oxygen in an alkaline electrolyte, requiring only a relatively small overpressure of about 0.5 atmosphere above atmospheric pressure.

EXAMPLE XIX

An electrode containing a synthetic plastic skeleton is obtained in the following manner:

Equal proportions by volume of polypropylene powder and sodium chloride powder of a particle size of between 10 and 40 microns are mixed and then at a temperature of 120° C., pressed into a shaped body. After dissolving the sodium chloride with water, the remaining porous skeleton of synthetic plastic material is impregnated with a silver carbonate-ammonium carbonate solution which contains 300 mg. of silver per cm.$^3$. The silver carbonate thus retained in the pores of the electrode body is reduced with hydrogen gas at a temperature of 110° C. Thereby, a porous electrode is obtained in which the silver catalyst serves for providing electric conductivity as well as for performing a catalytic function and the thus produced electrode is characterized by its particularly light weight.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing a porous electrode for electrochemical processes, such as an electrode for an electrochemical fuel cell, comprising the steps of providing an electrically conductive, porous electrode body of a porosity of between about 50% to about 70%; at least partially filling the pores of said porous electrically conductive electrode body with an alloy comprising a nobler and a less noble metal, said nobler metal being adapted to act in finely subdivided form as a catalyst in an electrode for a fuel cell and the like; and dissolving the less noble metal of said alloy so as to retain in said pores of said electrode body only said nobler metal in the form of a finely subdivided catalytically active layer.

2. A method of producing a porous electrode for electrochemical processes, such as an electrode for an electrochemical fuel cell, comprising the steps of providing an electrically conductive, porous electrode body of a porosity of at least about 50%; at least partially filling the pores of said porous electrically conductive electrode body formed of graphite with a solution including the components of an alloy comprising a nobler and a less noble metal, said nobler metal being adapted to act in finely subdivided form as a catalyst in an electrode for a fuel cell and the like; forming of said solution in the pores of said electrode body said alloy; and dissolving the less noble metal of said alloy so as to retain in said pores of said electrode body only said nobler metal in the form of a finely subdivided catalytically active layer.

3. A method of producing a porous electrode for electrochemical processes, such as an electrode for an electrochemical fuel cell, comprising the steps of providing an electrically conductive, porous electrode body of a porosity of at least about 50%; at least partially filling the pores of said porous electrically conductive electrode body formed of graphite with the liquid components of an alloy comprising a nobler and a less noble metal, said nobler metal being adapted to act in finely subdivided form as a catalyst in an electrode for a fuel cell and the like; forming of said components in the pores of said electrode body said alloy; and dissolving the less noble metal of said alloy so as to retain in said pores of said electrode body only said nobler metal in the form of a finely subdivided catalytically active layer.

4. A method of producing a porous electrode for electrochemical processes, such as an electrode for an electrochemical fuel cell, comprising the steps of providing an electrically conductive, porous electrode body of a porosity of at least about 50%; at least partially filling the pores of said porous electrically conductive electrode body with a solution of a salt of a nobler metal and a solution of a salt of a less noble metal, said nobler metal being adapted to act in finely subdivided form as a catalyst is an electrode for a fuel cell; reducing said salts in the pores of said electrode body so as to retain therein only said nobler and said less noble metal; forming in said pores an alloy of said nobler and said less noble metal; and dissolving said less noble metal of said alloy so as to retain in said pores of said electrode body only a layer of said nobler metal in finely subdivided catalytically active form.

5. A method of producing a porous electrode for electrochemical processes, such as an electrode for an electrochemical fuel cell, comprising the steps of providing an electrically conductive, porous electrode body of a porosity of at least about 50%; at least partially filling the pores of said porous electrically conductive electrode body formed of graphite with a solution of a salt of a nobler metal and a solution of a salt of a less noble metal, said nobler metal being adapted to act in finely subdivided form as a catalyst in an electrode for a fuel cell; electrochemically reducing said salts in the pores of said electrode body so as to retain therein only said nobler and said less noble metal; forming in said pores an alloy of said nobler and said less noble metal; and dissolving said less noble metal of said alloy so as to retain in said pores of said electrode body only a layer of said nobler metal in finely subdivided catalytically active form.

6. A method of producing a porous electrode for electrochemical processes, such as an electrode for an electrochemical fuel cell, comprising the steps of providing an electrically conductive, porous electrode body of a porosity of at least about 50%; at least partially filling the pores of said porous electrically conductive electrode body formed of graphite with a solution of a salt of a nobler metal and a solution of a salt of a less noble metal, said nobler metal being adapted to act in finely subdivided form as a catalyst in an electrode for a fuel cell; reducing said salts in the pores of said electrode body by contact with hydrogen gas at elevated temperature so as to retain in said pores only said nobler and said less noble metal and forming therein an alloy of said nobler and said less noble metal; and dissolving said less noble metal of said alloy so as to retain in said pores of said electrode body only a layer of said nobler metal in finely subdivided catalytically active form.

7. A method of producing a porous electrode for electrochemical processes, such as an electrode for an electrochemical fuel cell, comprising the steps of providing an electrically conductive, porous electrode body of a porosity of at least about 50%; at least partially filling the pores of said porous electrically conductive electrode body formed of graphite with a solution containing a salt of a nobler metal and also containing a salt of a less noble metal, said nobler metal being adapted to act in finely subdivided form as a catalyst in an electrode for a fuel cell; reducing said salts in the pores of said electrode body so as to retain therein only said nobler and said less noble metal; forming in said pores an alloy of said nobler and said less noble metal; and dissolving said less noble metal of said alloy so as to retain in said pores of said electrode body only a layer of said nobler metal in finely subdivided catalytically active form.

8. A method of producing a porous electrode for electrochemical processes, such as an electrode for an electrochemical fuel cell, comprising the steps of providing an electrically conductive, porous electrode body of a porosity of at least about 50%; impregnating said porous electrically conductive electrode body with a first metal salt solution; reducing said metal salt in the pores of said electrode body so as to form therein said first metal; impregnating said porous body with a solution of a salt of second metal; reducing said salt of said second metal in the pores of said electrode body so as to form therein said second metal; heating said electrode body with said first and second metal in the pores thereof so as to form in said pores an alloy of said first and second metal; and dissolving the less noble metal of said alloy so as to retain in said pores of said electrode body only a layer of the nobler of said metals in finely subdivided form, said nobler metal being so chosen as to be adapted to act in such finely subdivided form as catalyst in an electrode for a fuel cell.

9. A method of producing a porous electrode for electrochemical processes, such as an electrode for an electrochemical fuel cell, comprising the steps of providing an electrically conductive, porous electrode body of a porosity of at least about 50%; at least partially filling the pores of said porous electrically conductive electrode body with a molten alloy of a nobler and a less noble metal, said nobler metal being adapted to act in finely subdivided form as a catalyst in an electrode for a fuel cell and the like; forming of said components in the pores of said electrode body said alloy; allowing said alloy in said pores to solidify; and dissolving the less noble metal of said alloy so as to retain in said pores of said electrode body only said nobler metal in the form of a finely subdivided catalytically active layer.

10. A method of producing a porous electrode for electrochemical processes, such as an electrode for an electrochemical fuel cell, comprising the steps of providing an electrically conductive, porous electrode body of a porosity of at least about 50%; at least partially filling under pressure the pores of said porous electrically conductive electrode body formed of graphite with a molten alloy of a nobler and a less noble metal, said nobler metal being adapted to act in finely subdivided form as a catalyst in an electrode for a fuel cell and the like; forming of said components in the pores of said electrode body said alloy; allowing said alloy in said pores to solidify while maintaining said pressure and dissolving the less noble metal of said alloy so as to retain in said pores of said electrode body only said nobler metal in the form of a finely subdivided catalytically active layer.

11. A method of producing a porous electrode for electrochemical processes, such as an electrode for an electrochemical fuel cell, comprising the steps of providing an electrically conductive, porous electrode body of a porosity of at least about 50%; impregnating said porous electrically conductive electrode body with a solution of a salt of a first metal; reducing said metal salt in the pores of said electrode body so as to form therein said first metal partially filling said pores; immersing said porous electrode body with said first metal partially filling the pores thereof into a molten second metal so as to contact said first metal in said pores with said molten second metal and forming in said pores an alloy of said first and second metal; and dissolving the less noble metal of said alloy so as to retain in said pores of said electrode body only the nobler of said metals in finely subdivided form, said nobler metal being adapted to act as catalyst in an electrode for a fuel cell.

12. A method as defined in claim 1, wherein said porous body consists essentially of a material selected from the group consisting of graphite and sintered metal.

13. A method as defined in claim 12, wherein said porous body consists of graphite.

14. A method as defined in claim 12, wherein said porous body consists of sintered metal selected from the group consisting of nickel, cobalt and steel.

15. A method as defined in claim 14, wherein said porous body consists essentially of nickel.

16. A method as defined in claim 1, wherein the porosity of said porous body is equal to between about 50% and 70%.

References Cited
UNITED STATES PATENTS

| | | | |
|---|---|---|---|
| 2,583,619 | 1/1952 | White | 29—529 |
| 2,818,393 | 12/1957 | Lafrancois et al. | 252—473 |
| 2,829,116 | 1/1958 | Alexander | 29—529 |
| 3,060,133 | 10/1962 | Jockers | 252—447 |

CHARLIE T. MOON, *Primary Examiner.*

P. M. COHEN, *Assistant Examiner.*